(12) United States Patent
Fazel Sarjoui et al.

(10) Patent No.: US 10,244,472 B2
(45) Date of Patent: Mar. 26, 2019

(54) AUTOMATIC POWER CONFIGURATION FOR A POINT-TO-MULTIPOINT DISTRIBUTED RADIO ACCESS NETWORK

(71) Applicant: CommScope Technologies LLC, Hickory, NC (US)

(72) Inventors: Fatemeh Fazel Sarjoui, Somerville, MA (US); Nagi Jayaraman Mahalingam, Windham, NH (US); Ehsan Daeipour, Southborough, MA (US); Michael McFarland, Newton, MA (US)

(73) Assignee: CommScope Technologies LLC, Hickory, NC (US)

( * ) Notice: Subject to any disclaimer, the term of this patent is extended or adjusted under 35 U.S.C. 154(b) by 57 days.

(21) Appl. No.: 15/442,361

(22) Filed: Feb. 24, 2017

(65) Prior Publication Data

US 2017/0251430 A1    Aug. 31, 2017

Related U.S. Application Data

(60) Provisional application No. 62/301,407, filed on Feb. 29, 2016.

(51) Int. Cl.
*H04L 29/14*      (2006.01)
*H04W 52/02*    (2009.01)
(Continued)

(52) U.S. Cl.
CPC ......... *H04W 52/0212* (2013.01); *H04L 69/40* (2013.01); *H04W 76/27* (2018.02);
(Continued)

(58) Field of Classification Search
CPC ...... H04W 52/02; H04W 80/02; H04W 76/04
See application file for complete search history.

(56) References Cited

U.S. PATENT DOCUMENTS 9,166,630 B1 *  10/2015  Miller .................. H04B 1/0032
2008/0102794 A1 *  5/2008  Keevill ............... H04L 12/5692
                                                           455/411

(Continued)

FOREIGN PATENT DOCUMENTS

WO    2013048526    4/2013
WO    2015060562    4/2015
WO    2015072703    5/2015

OTHER PUBLICATIONS

International Search Authority, "International Search Report and the Written Opinion", "Foreign Counterpart to U.S. Appl. No. 15/442,361", filed May 24, 2017, pp. 1-14, Published in: WO.

*Primary Examiner* — Chi Ho A Lee
*Assistant Examiner* — Andrew Lee
(74) *Attorney, Agent, or Firm* — Fogg & Powers LLC

(57) ABSTRACT

One embodiment is directed to a system to provide wireless service to user equipment. The system comprising a controller communicatively coupled to a core network and a plurality of radio points to transmit and receive radio frequency signals to and from the user equipment. Each of the radio points is associated with at least one antenna and is located remote from the controller. The plurality of radio points is communicatively coupled to the controller. The controller comprises at least one baseband modem to perform Layer-3, Layer-2, and Layer-1 processing for the air interface. The controller is configured to automatically control transmit power for the radio points based on operational measurements (OMs) for each radio point, wherein the OMs are based on radio resource control (RRC) messages received at the controller. In some implementations, the radio points are configured to perform at least some Layer-1 processing for the air interface.

28 Claims, 6 Drawing Sheets

(51) Int. Cl.
*H04W 80/02* (2009.01)
*H04W 76/27* (2018.01)
(52) U.S. Cl.
CPC ............ *H04W 80/02* (2013.01); *Y02D 70/00* (2018.01); *Y02D 70/1242* (2018.01); *Y02D 70/1262* (2018.01); *Y02D 70/142* (2018.01); *Y02D 70/146* (2018.01); *Y02D 70/23* (2018.01)

(56) References Cited

U.S. PATENT DOCUMENTS

| | | | | |
|---|---|---|---|---|
| 2010/0041427 | A1* | 2/2010 | Hannu | H04W 52/16 455/522 |
| 2011/0096736 | A1 | 4/2011 | Kwon et al. | |
| 2011/0096869 | A1 | 4/2011 | Nakayama | |
| 2011/0201332 | A1* | 8/2011 | Siomina | G01S 5/10 455/434 |
| 2014/0249998 | A1* | 9/2014 | Gotanda | G07G 5/00 705/39 |
| 2015/0341941 | A1* | 11/2015 | Nguyen | H04W 72/082 370/332 |
| 2016/0105853 | A1* | 4/2016 | Zhao | H04W 52/244 370/311 |
| 2016/0335883 | A1* | 11/2016 | Breed | G08B 29/18 |

\* cited by examiner

AUTOMATIC POWER CONFIGURATION FOR A POINT-TO-MULTIPOINT DISTRIBUTED RADIO ACCESS NETWORK

CROSS-REFERENCE TO RELATED APPLICATION

This application claims the benefit of U.S. Provisional Patent Application Ser. No. 62/301,407, filed on Feb. 29, 2016, which is hereby incorporated herein by reference.

BACKGROUND

The family of 3GPP Long-Term Evolution (LTE) specifications includes specifications that define Self-Organizing Network (SON) features that can be used for automatically configuring, optimizing, and healing E-UTRAN Node Bs (also referred to here as "eNodeBs" or "eNBs") in an LTE radio access network (RAN).

However, it may be desirable to provide additional features for automatically configuring and optimizing the transmit power of nodes used in some RAN architectures and systems.

SUMMARY

One embodiment is directed to a system to provide wireless service to user equipment using an air interface. The system comprises a controller communicatively coupled to a core network and a plurality of radio points to transmit and receive radio frequency signals to and from the user equipment, each of the radio points associated with at least one antenna and located remote from the controller. The plurality of radio points is communicatively coupled to the controller. The controller comprises at least one baseband modem to perform Layer-3, Layer-2, and Layer-1 processing for the air interface. The controller is configured to automatically control transmit power for the radio points based on operational measurements (OMs) for each radio point, wherein the OMs are based on radio resource control (RRC) messages received at the controller.

Another embodiment is directed to a controller for providing wireless service to user equipment using an air interface. The controller comprises at least one baseband unit to perform Layer-3, Layer-2, and Layer-1 processing for the air interface. The controller further comprises a front-haul interface to communicatively couple the controller to a plurality of radio points that transmit and receive radio frequency signals to and from the user equipment, each of the radio points associated with at least one antenna and located remote from the controller. The controller further comprises a back-haul interface to communicatively couple the controller to a core network. The controller is configured to automatically control transmit power for the radio points based on operational measurements (OMs) for each radio point, wherein the OMs are based on radio resource control (RRC) messages received at the controller.

Another embodiment is directed to a method of providing wireless service to user equipment using an air interface. The method comprises performing Layer-3, Layer-2, and Layer-1 processing for the air interface in a controller that is communicatively coupled to a plurality of radio points that transmit and receive radio frequency signals to and from the user equipment, each of the radio points associated with at least one antenna and located remote from the controller. The method further comprises maintaining operational measurements (OMs) for each radio point in the controller, wherein the OMs are based on radio resource control (RRC) messages received at the controller. The method further comprises automatically controlling transmit power for the radio points based on the OMs.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
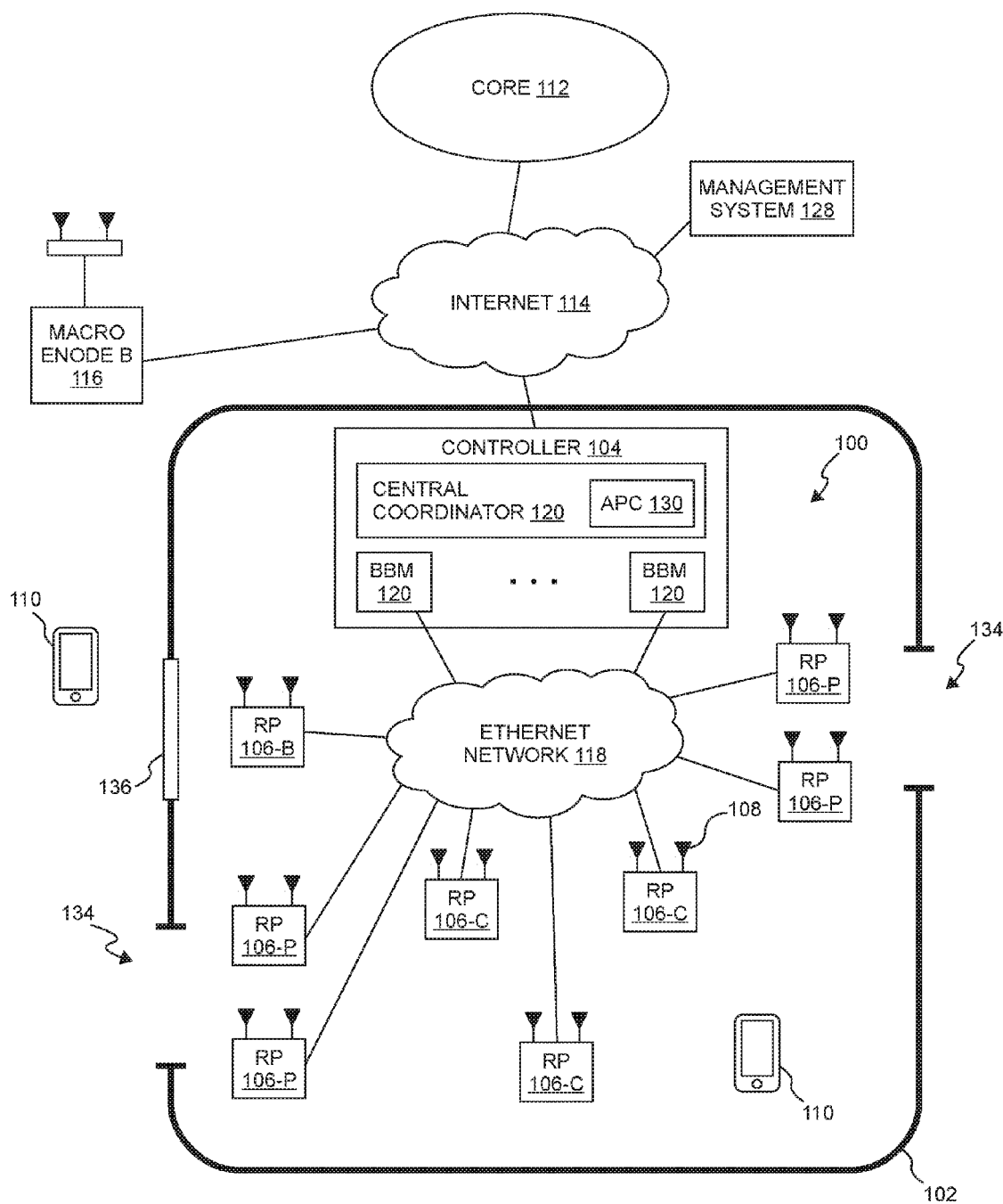
FIG. 1 is a block diagram illustrating one exemplary embodiment of a radio access network (RAN) 100 suitable for use with the automatic power control techniques described here.

FIG. 1 is a block diagram illustrating one exemplary embodiment of a radio access network (RAN) 100 that is deployed at a site 102 to provide wireless coverage and capacity for one or more wireless network operators. The site 102 may be, for example, a building or campus or other grouping of buildings (used, for example, by one or more businesses, government entities, or other enterprises) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the RAN 100 at the site 102 is implemented at least in part using a point-to-multipoint distributed base station architecture that employs at least one central controller 104 and multiple radio points (RPs) 106. Each RP 106 includes or is coupled to one or more antennas 108 via which downstream RF signals are radiated to user equipment 110 and via which upstream RF signals transmitted by user equipment 110 are received.

The RAN 100 is coupled to the core network 112 of each wireless network operator over an appropriate back-haul. In the exemplary embodiment shown in FIG. 1, the Internet 114 is used for back-haul between the RAN 100 and each core network 112. However, it is to be understood that the back-haul can be implemented in other ways.

The exemplary embodiment of the RAN 100 shown in FIG. 1 is described here as being implemented as a Long Term Evolution (LTE) radio access network providing wireless servicer using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 in order to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) and a Serving Gateway (SGW) and, optionally, a Home eNodeB gateway (HeNB GW) and a Security Gateway (SeGW) (all of which are not shown in FIG. 1).

Moreover, in this exemplary embodiment, each controller 104 communicates with the MME and SGW in the EPC core network 112 using the LTE S1 interface and communicates with other eNodeBs using the LTE X2 interface. In the example shown in FIG. 1, the controller 104 communicates with an outdoor macro eNodeB 116 via the LTE X2 interface.

The controller 104 and the radio points 106 can be implemented to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), and/or multiple-input-single-output (MISO) schemes. Moreover, the controller 104 and/or the radio points 106 can be configured to support multiple air interfaces and/or to support multiple wireless operators.

Although the exemplary embodiment shown in FIG. 1 is described here as being implemented in an LTE network to provide wireless service using an LTE air interface, it is to be understood that the RAN 100 can be implemented other ways, for example, to be used with other networks and air interfaces such as IEEE 802.11, which is more popularly known as Wi-Fi, or IEEE 802.16, which is also known as Wi-Max, and 3G air interfaces such as Universal Mobile Telecommunications System (UMTS). In addition, it is to be understood that the RAN 100 can be implemented using air interfaces that makes use of licensed RF spectrum, unlicensed RF spectrum, or combinations thereof.

In the particular exemplary embodiment shown in FIG. 1, the front-haul that communicatively couples each controller 104 to the one or more RPs 106 is implemented using a standard ETHERNET network 118. However, it is to be understood that the front-haul between the controllers 104 and RPs 106 can be implemented in other ways.

Generally, one or more nodes in a RAN perform analog radio frequency (RF) functions for the air interface as well as digital Layer 1, Layer 2, and Layer 3 (of the Open Systems Interconnection (OSI) model) functions for the air interface.

Figure 2:
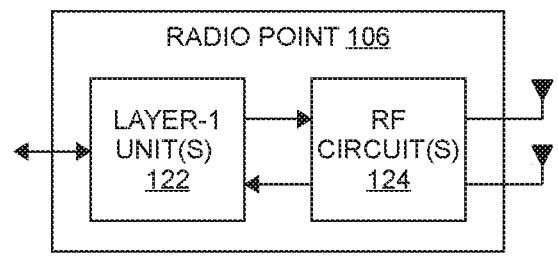
FIG. 2 is a block diagram of one exemplary embodiment of a radio point suitable for use in the RAN of FIG. 1.

In the exemplary embodiment shown in FIG. 1, each controller 104 includes one or more baseband modems (BBMs) (or other units) 120 that perform digital Layer-3, Layer-2, and Layer-1 processing for the LTE air interface, and, as shown in FIG. 2, each RP 106 includes (optionally) one or more Layer-1 units 122 that implements any Layer-1 processing for the air interface that is not performed in the controller 104 and one or more radio frequency (RF) circuits 124 that implement the RF front-end functions for the air interface and the one or more antennas 108 associated with that RP 106.

In one implementation of the RAN 100 shown in FIG. 1, the baseband modems 120 in the controllers 104 perform all of the digital Layer-3, Layer-2, and Layer-1 processing for the air interface, while the RPs 106 (specifically, the RF circuits 118) implement only the RF functions for the air interface and the antennas 108 associated with each RP 106. IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 118 is able to deliver the required high data rate.

In some other implementations, the front-haul ETHERNET network 118 is not able to deliver the data rate needed to front haul time-domain IQ data (for example, where the front-haul is implemented using typical enterprise-grade ETHERNET networks). In such implementations, this issue can be addressed by communicating IQ data representing frequency-domain symbols for the air interface between the CUs 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 118. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

In implementations where frequency-domain IQ data is front-hauled between the controllers 104 and the RPs 106, the baseband modems 120 in each controller 104 perform all of the digital Layer-3, Layer-2, and Layer-1 processing for the air interface except for the inverse fast Fourier transform (IFFT) in the downstream and the fast Fourier transform (FFT) in the upstream. In these implementations, the Layer-1 functions 122 (shown in FIG. 2) in each RP 106 implement the digital Layer-1 processing for the air interface that is not performed in the controller 104 (that is, the IFFT in the downstream and the FFT in the upstream).

In yet other implementations where the front-haul ETHERNET network 118 is not able to deliver the data rate need to front haul (uncompressed) time-domain IQ data, the time-domain IQ data is compressed prior to being communicated over the ETHERNET network 118, thereby reducing the data rate needed communicate such IQ data over the ETHERNET network 118.

In other implementations, data is front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each baseband modem 120 in the controller 104 provides the capacity of a single cellular sector. With traditional base stations (for example, with traditional small cell or distributed base stations), the capacity provided by each baseband modem creates a separate cell, having a separate physical cell identifier associated with that cell and transmitting separate control and reference signals associated with that cell. Traditionally, when the capacity provided by several baseband modems (for example, in the form of several small cell base stations) is densely deployed within a site (with the capacity provided by each baseband modem creating a separate cell), multiple overlapping cells are created with interference at cell borders. This happens even when there is a traditional central service controller that is coordinating multiple small cell base stations. The service controller can assist with network configuration and optimization, handovers, and backhaul aggregation, but does not address the issue that each baseband modem forms a separate, standalone cell and interferes with its neighboring separate, standalone cells. The signal quality in these overlap areas can drop significantly, reducing data speeds and impairing voice quality. Also, creating multiple separate cells generates frequent handovers, for example, in the form of "ping-ponging" of stationery users in border areas, or as users move about the site. This further degrades the user experience, and also creates the potential for handover failures.

To address these issues with creating separate cells for the capacity provided by each baseband modem, in the exemplary embodiment shown in FIG. 1, the capacity provided by multiple baseband modems 120 is used within a common, single "super" cell, sharing a common physical cell identifier and for which common control and reference signals are transmitted. In this embodiment, each controller 104 includes a central coordinator 126 that performs central resource block scheduling for all of the baseband modems 120 across all of the RPs 106 and all of the user equipment 110 associated with those baseband modems 120. Frequency reuse techniques can be used to create virtual sectors within the single super cell, with different baseband modems 120 providing capacity to each of the virtual sectors. The central coordinator 126 can also serve as an aggregation point for data that is transmitted and received using multiple baseband modems 120 and multiple RPs 106.

The central coordinator 126 can schedule multiple RPs 106 to jointly transmit to an individual UE 110, helping overcome an interfering macro signal without having to boost RP transmit power such that it would interfere with the macro. Similarly, the central coordinator 126 can schedule multiple RPs 106 to jointly receive uplink transmissions from a single UE 110, which are then combined at the controller 104 (either in the baseband modem 120 or in the central coordinator 126). This inter-RP uplink combining enables the UE 110 to transmit at a lower power, reducing its interference on the macro uplink. Additional details regarding the creation of such a super cell can be found in U.S. patent application Ser. No. 13/762,283, mentioned above.

The baseband modems 120 and the central coordinator 126 in each controller 104 can be implemented in software or firmware executing on one or more suitable programmable processors. The baseband modems 120 and the central coordinator 126 in each controller 104 (or portions thereof) can be implemented in other ways (for example, in a field programmable gate array (FPGA), application specific integrated circuit (ASIC), etc.). The baseband modem 120 and the central coordinator 126 in each controller 104 can be implemented in other ways.

Likewise, one or more Layer-1 units 122 (shown in FIG. 2) in each RP 106 can be implemented in software or firmware executing on one or more suitable programmable processors. The one or more Layer-1 units 122 in each RP 106 (or portions thereof) can be implemented in other ways (for example, in a field programmable gate array (FPGA), application specific integrated circuit (ASIC), etc.). The one or more RF circuits 124 (shown in FIG. 2) in each RP 106 can be implemented using one or more RF integrated circuits (RFICs) and/or discrete components. The Layer-1 units 122 and RF circuit 124 in each RP 106 can be implemented in other ways.

In some implementations, the common, single super cell is created using baseband modems 120 from multiple controllers 104, where resource block scheduling is performed across all of the baseband modems 120 from the multiple controllers 104 (for example, using one or more of the central coordinators 126 in the controllers 104 and/or using a separate global coordinator).

Although the exemplary embodiment shown in FIG. 1 makes use of a central coordinator 126 to create a super cell as described above, it is to be understood that other embodiments are implemented in other ways (for example, where the controllers 104 do not include such a central coordinator 126 and instead such coordination functions are incorporated into each baseband modem 120).

The controllers 104 may also include certain MME functionality (not shown) and SGW functionality (not shown), thus allowing traffic to flow directly between UE 110 and a destination node on the Internet 114 or on a local network at the site 102 without traversing an operator's core network 112.

In the exemplary embodiment shown in FIG. 1, a management system 128 is communicatively coupled to the controllers 104 and RPs 106, for example, via the Internet 114 and ETHERNET network 118 (in the case of the RPs 106).

In the exemplary embodiment shown in FIG. 1, the management system 128 communicates with the various elements of the RAN 100 using the Internet 114 and the ETHERNET network 118. Also, in some implementations, the management system 128 sends and receives management communications to and from the controllers 104, each of which in turn forwards relevant management communications to and from the RPs 106.

In the exemplary embodiment shown in FIG. 1, the central coordinator 126 in each controller 104 also implements an automatic power control (APC) function 130 to automatically control the transmit power of the RPs 106 associated with that controller 104. The automatic power control can be performed as a part of or in connection with other self-organizing network (SON) features supported by the RAN 100 (for example, as a part of or in connection with LTE SON features).

In the exemplary embodiment described here in connection with FIG. 1, each radio point 106 is located within the cell so as to function as one of multiple types of radio points 106. In this exemplary embodiment, there are three types of RPs 106.

A "portal" type of RP 106 is an RP 106 that is located near an entrance or exit of the site 102 (for example, a door or other entrance or exit 134 to the site 102). RPs 106 that are of a portal type (also referred to here "portal RPs" 106) are shown in FIG. 1 using reference numeral "106-P." In some deployments, more than one RP 106 may be positioned near an entrance or exit 134 to the site 102 in order to overcome interference from the macro eNodeB 116.

A "boundary" type of RP 106 is an RP 106 located near a window or similar feature 136 of the site 102 via which signals from user equipment 110 located outside of the site 102 may be propagate into the cell and via which signals from the RP 106 may propagate to such user equipment 110 located outside of the site 102. RPs 106 that are of a boundary type (also referred to here "boundary RPs" 106) are shown in FIG. 1 using reference numeral "106-B."

A "coverage" type of RP 106 is an RP 106 that is located where coverage needs to be expanded (for example, where coverage holes would otherwise exist without the RP 106). Coverage RPs 106 are usually positioned well within the boundaries of the site 102 and the cell. RPs 106 that are of a coverage type (also referred to here "coverage RPs" 106) are shown in FIG. 1 using reference numeral "106-C."

In this embodiment, the transmit power of each RP 106 is automatically controlled based on the type of RP 106 that the RP 106 functions as.

The APC function 130 also uses "signature vectors" (SV) determined for each UE 110 and various operational measurements (OMs) determined for each RP 106 based on radio resource control (RRC) messages received at the controller 104.

In general, when a UE 110 makes initial LTE Physical Random Access Channel (PRACH) transmissions when it first connects to the cell for the site 102, each RP 106 associated with a controller 104 will receive those initial PRACH transmission. The controller 104 maintains a signature vector for each UE 110 that includes, for each RP 106 associated with the cell, a signal reception metric indicative of the power level being received by that RP 106 from that UE 110 (for example, a signal-to-noise plus interference ratio (SNIR)). This signature vector (SV) is a measure of the UE's proximity to each RP 106 associated with the cell and is used to track the mobility of the UE 110. Initially, this SV will be based solely on the reception of the initial PRACH transmissions when the UE 110 first connects to the cell. This initial SV is also referred to here as the "PRACH SV." As additional uplink transmissions from that UE 110 are received by the various RPs 106 in the cell, the controller 104 will update the signature vector for that UE 110 based on the relative received power of the UE's uplink channel at the RPs 106. This updated SV is also referred to here as the "functional SV."

In this exemplary embodiment, each OM comprises a counter that is incremented when certain events occur. Each such counter is maintained for each RP 106 in the cell and is incremented when the associated event occurs at that RP 106.

One OM that is used by the APC function 130 is a "Greeting" counter.

The Greeting counter for a given radio point 106 maintains a count, for the given period, of hand-ins to the cell for which that radio point 106 was the primary radio point (described below). The Greeting counters for the various RPs 106 are incremented as follows.

Figure 3:
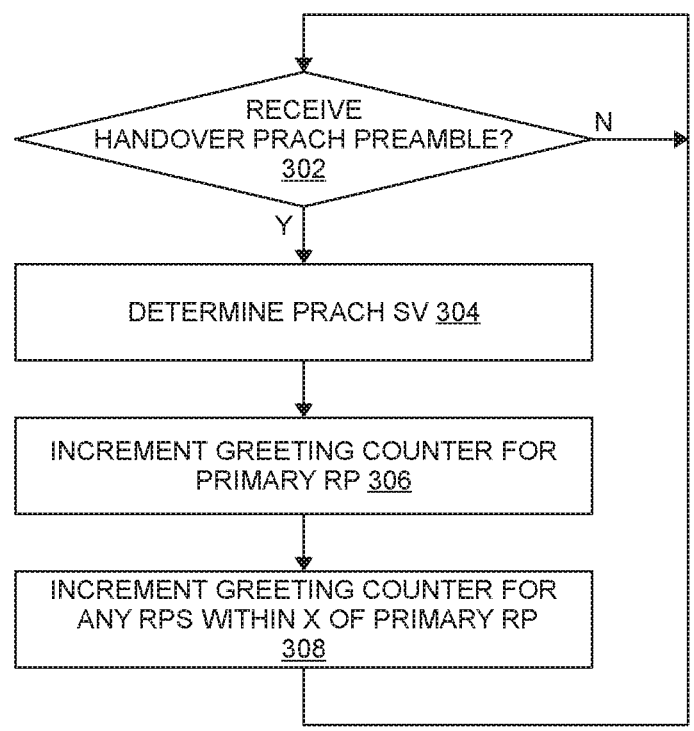
FIG. 3 is a flow diagram of one exemplary embodiment of a method of incrementing greeting counters for radio points in a cell.

FIG. 3 is a flow diagram of one exemplary embodiment of a method 300 of incrementing the Greeting counters for the various RPs 106 in the cell for the site 102.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner).

The processing associated with method 300 is performed when the controller 104 receives a HANDOVER PRACH preamble transmission (block 302).

When a UE 110 makes a HANDOVER PRACH preamble transmission, the initial PRACH transmissions made by the UE 110 will be received at the RPs 106 of the cell. The controller 104 will determine the PRACH SV for that UE 110 based on the initial PRACH preamble transmissions (block 304).

Typically, a UE 110 that is making an initial HANDOVER PRACH preamble transmission will do so around the time that the UE 110 entered the cell and, as a consequence, will typically be near an entrance of the site 102. As a result, it is expected that the one or more portal RPs 106 positioned near that entrance will receive the UE's initial PRACH transmissions with higher signal reception metrics than other RPs 106.

The Greeting counter associated with the RP 106 that has highest signal reception metric in the PRACH SV for that UE 110 is incremented (block 306). This RP 106 is also referred to here as the "primary RP." Also, in those deployments where multiple portal RPs 106 are positioned near site entrances, the Greeting counters associated with any RP 106 having a signal reception metric that is within a predetermined amount (X) of the signal reception metric of the primary RP 106 is also incremented (block 308). This predetermined amount (X) is configurable. For example, in one implementation, the Greeting counters associated with any RP 106 having a signal reception metric that is within 2 dB of the signal reception metric of the primary RP 106 is also incremented.

That is, it is likely that the primary RP 106 and any RP 106 having a signal reception metric that is within the predetermined amount of the signal reception metric of the primary RP 106 are located at or near an entrance to the site 102 and will be closest to the UE 110 when it transmits its initial PRACH transmissions.

Another set of OMs that are used by the APC function 130 is a set of "Radio Link Failure" (RLF) counters.

The set of RLF counters includes a "Site RLF" counter for each radio point 106 that includes a count, for the relevant period, of radio link failures that occurred when a UE 110 was connected to the site cell (where that radio point 106 is the primary radio when the UE 110 re-connects). The set of RLF counters includes a "Macro RLF" counter for each radio point 106 that includes a count, for the relevant period, of radio link failures that occurred when a UE 110 was connected to the macro cell associated with the neighbor macro eNodeB 116 (where that radio point 106 is the primary radio when the UE 110 re-connects). The set of RLF counter also includes a "Total RLF" counter for each radio point 106, which is the sum of the respective Site RLF counter for the relevant period and the Macro RLF counter for the relevant period.

Figure 4:
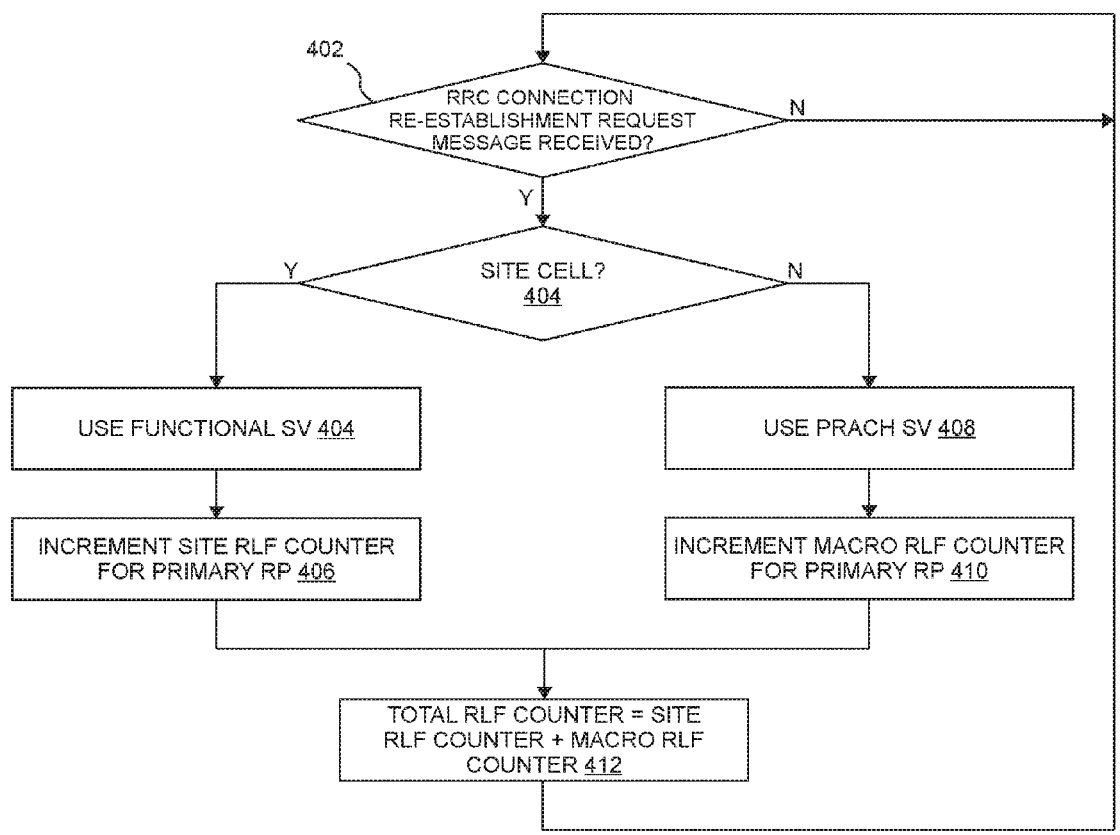
FIG. 4 is a flow diagram of one exemplary embodiment of a method of incrementing radio link failure counters for radio points in a cell.

FIG. 4 is a flow diagram of one exemplary embodiment of a method 400 of incrementing the RLF counters for the various RPs 106 in the cell for the site 102.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner).

Method 400 is performed for a UE 110 upon receipt of an RRC CONNECTION RE-ESTABLISHMENT REQUEST message from that UE 110 on the PRACH (block 402).

When a radio link failure occurs for a UE 110, the UE 110 transmits an RRC CONNECTION RE-ESTABLISHMENT REQUEST message on the PRACH. The RRC CONNEC- TION RE-ESTABLISHMENT REQUEST message includes the physical cell identifier (PCI) of the source eNodeB to which the UE 110 was connected prior to the failure. This PCI is used to determine if, prior to the failure, the UE 110 was connected to the cell associated with the site 102 or the cell associated with the macro eNodeB 116.

If the UE 110 was connected to the site cell prior to the failure (block 404), a functional SV will exist for that UE 110 and is used to determine the primary RP for that message (block 408). In addition, in this case, a Site RLF counter for the primary RP 106 is incremented (block 410).

If the UE 110 was connected to the macro cell prior to the failure, the PRACH SV created from the UE's initial PRACH transmissions is used to determine the primary RP (block 412). In addition, in this case, a Macro RLF counter for the primary RP 106 is incremented (block 414).

A Total RLF counter is calculated by adding the Site RFL counter and the Macro RLF counter together (block 416).

Other OMs that are used by the APC function 130 include "Boundary" counters, "Hand-Out" counters, and "Leakage" counters for each RP 106.

The Hand-Out counter for a given radio point 106 maintains a count, for the given period, of hand-outs from the cell for which that radio point 106 was the primary radio point. The Boundary counter for a given radio point 106 maintains a count, for the given period, of hand-outs from the cell for which that radio point 106 was the primary radio point where the amount of time that the associated UE 110 was connected to the cell was less than a predetermined threshold value. The value of the Leakage Rate counter for a given radio point 106 the value of that RP's Boundary counter divided by that RP's Hand-Out counter.

Figure 5:
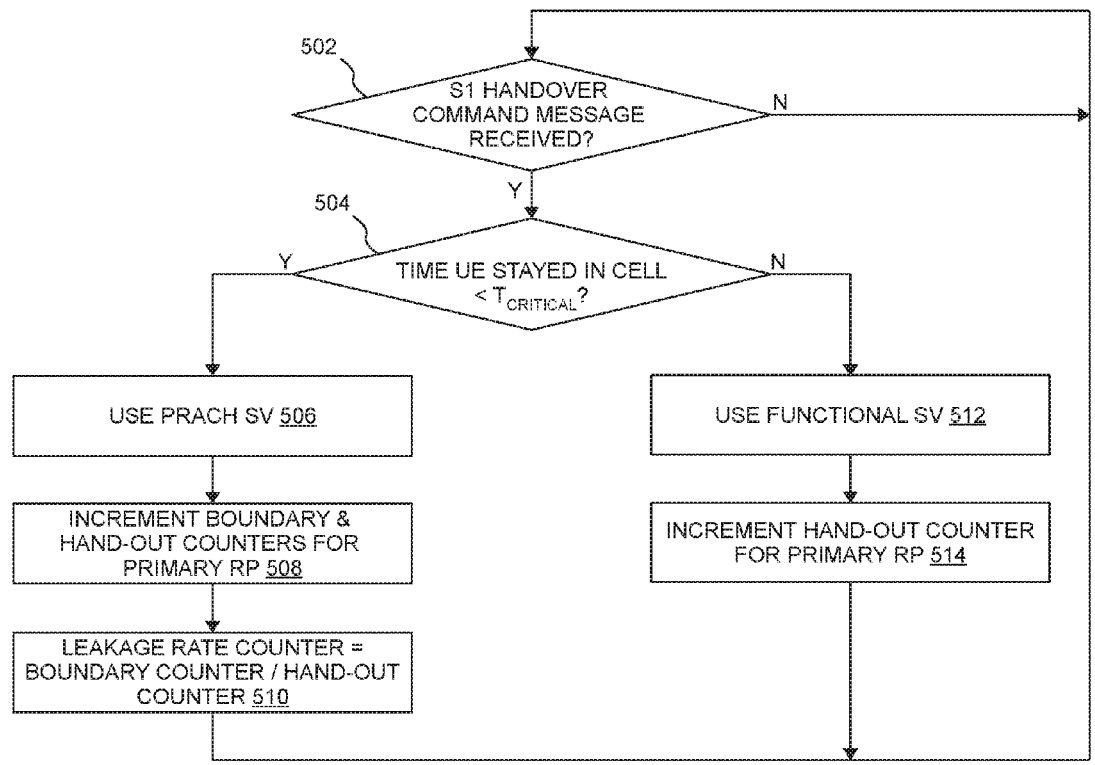
FIG. 5 is a flow diagram of one exemplary embodiment of a method of incrementing a boundary counter, hand-out counter, and a leakage counter for radio points in a cell.

FIG. 5 is a flow diagram of one exemplary embodiment of a method 500 of incrementing a Boundary counter, Hand-Out counter, and a Leakage counter for the various RPs 106 in the cell for the site 102.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner).

Method 500 is performed in connection with a UE 110 that is currently connected to the site cell being handed over to another cell (for example, to the macro cell associated with the macro eNodeB 116).

Signals radiated from a boundary RP 106 located near a window or similar opening 136 in the boundary of the site 102 will tend to propagate out of the site 102 and into the neighbor macro cell. A UE 110 located in the macro cell and outside of the site cell, but near a window or similar opening 136 in the boundary of the site 102, may connect to the site cell. However, the signals from the site cell will likely not dominate the signals from the macro cell. As a result, the UE 110 will stay connected to the site cell for only short amount of time before being handed out to the macro cell.

The amount of time that a UE 110 has been connected to the site cell before being handed out can be compared to a predetermined threshold amount of time ($T_{critical}$) in order to determine these situations where a UE 110 located outside of the boundary of the site 102 is connecting to the site cell.

In this exemplary embodiment, the controller 104 is configured to collect UE History Information for each UE 110 that is connected to the site cell. One item of UE History Information that is collected for each UE 110 is the amount of time that the UE 110 has been connected to the site cell (the "Time UE Stayed In Cell" information).

As noted above, method 500 is used when a UE 110 that is currently connected to the site cell is being handed-out to another cell (for example, to the macro cell associated with the macro eNodeB 116).

When a S1 HANDOVER COMMAND message is received at the controller 104 for such a hand-out (block 502), if the "Time UE Stayed In Cell" information included in the UE History Information is less than the predetermined threshold amount of time ($T_{critical}$) (block 504), the hand-out is likely occurring when the UE 110 is located outside of the boundary of the site 102 but near a window 136 in the boundary. In this case, the PRACH SV for that UE 110 is used to determine the primary RP (since the PRACH SV points to the first RP 106 that handed in the UE 110 and is hence identified to be the boundary RP 106) (block 506). In addition, in this case, the Boundary counter and the Hand-Out counter for the primary RP 106 are incremented (block 508) and the value of the Leakage counter for the primary RP 106 is updated by dividing the value of the Boundary counter by the value of the Hand-Out counter (block 510). The Leakage counter for a given RP 106 contains the leakage rate for that RP 106, which is the percentage of hand-outs for which that RP 106 was the primary RP 106 likely occurred while the associated UE 110 was located outside of the boundary of the site 102 but near a window 136 in the boundary (that is, the value of the Boundary counter divided by the value of the Hand-Out counter for a given RP 106).

If the "Time UE Stayed In Cell" information included in the UE History Information is not less than the predetermined threshold amount of time ($T_{critical}$), the hand-out is not likely occurring when the UE 110 is located outside of the boundary of the site 102 but near a window 136 in the boundary. In this case, the functional SV is used to determine the primary RP (block 512) and only the Hand-Out counter for the primary RP 106 is incremented (block 514).

In this exemplary embodiment, the APC function 130 uses the various OMs described above to automatically control the power in the various RPs 106.

Figure 6:
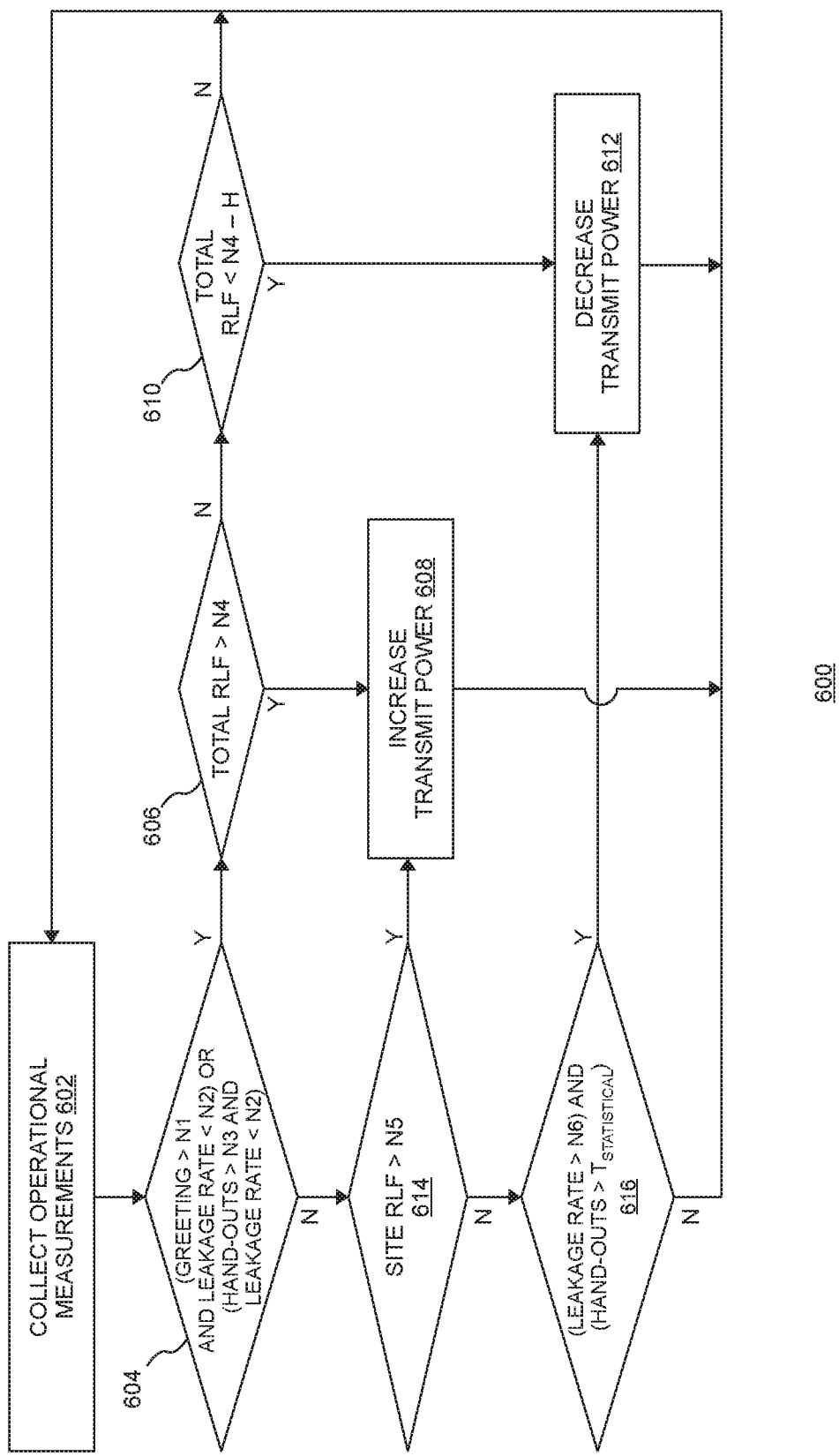
FIG. 6 is a flow diagram of one exemplary embodiment of a method of automatically controlling transmit power in a radio point.

FIG. 6 is a flow diagram of one exemplary embodiment of a method 600 of automatically controlling transmit power in an RP 106. The embodiment of method 600 is described here as being implemented in the RAN 100 of FIG. 1, though it is to be understood that other embodiments can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner).

The processing associated with method 600 is performed periodically (that is, once for a given period T) for each radio point 106 in the cell. The particular radio point 106 for which the processing is being performed is also referred to here as the "current" radio point 106.

The controller 104, for each period T, collects the OMs described above for the current RP 106 (block 602). For example, at the beginning of each period, the controller 104 initializes the various counters for the current RP 106. The controller 104 then waits for the particular events associated with each OM and, when such an event occurs, performs the processing described above in connection with FIGS. 3-5 to update the associated OMs.

Then, the APC function 130 in the controller 104 checks if either of two conditions are true for the current radio point 106 (block 604).

The first condition that is checked is if the value of the Greeting counter for the current RP 106 is greater than a first predetermined threshold value (N1) and the value of the Leakage counter for the current RP 106 is less than a second predetermined threshold value (N2). The first condition checks if the current RP 106 experiences a relatively high number of hand-ins while having a relatively low leakage rate, which indicates that the current RP 106 is located near an entrance and, therefore, is a portal RP 106.

The second condition that is checked in connection with block 604 is if the Hand-Out counter for the current RP 106 is greater than a third predetermined threshold value (N3) and the value of the Leakage Rate counter for the current RP 106 is less than a second predetermined threshold value (N2). The second condition checks if the current RP 106 experiences a relatively high number of hand-outs while having a relatively low leakage rate, which indicates that the current RP 106 is located near an exit and, therefore, is a portal RP 106.

If either of the two conditions associated with block 604 are true, the current RP 106 is a portal RP 106 and the APC function 130 in the controller 104 checks if the value of the Total RLF counter for the current RP 106 is greater than a fourth predetermined threshold value (N4) (block 606). If that is case, then the transmit power of the current RP 106 is increased (block 608). That is, if the current RP 106 (which is a portal RP 106 in this case) is experiencing a relatively high number of radio link failures, the transmit power of that RP 106 is increased in order to try to reduce the number radio link failures.

For this determination, the Total RLF counter is used (instead of the Site RLF counter) because the RP 106 is a portal RP 106 and is dealing with a significant number of UEs 110 that have just entered the site cell.

If the current RP 106 is a portal RP 106 and the value of the Total RLF counter for the current RP 106 is less than the fourth predetermined threshold value (N4) minus a predetermined hysteresis value (H) (block 610), the transmit power of the current RP 106 is decreased (block 612). In this situation, the rate of radio link failures for the current RP 106 is sufficiently low that is possible to back off on the current RP's transmit power in order to reduce the amount of interference that the RP 106 causes with the macro cell. The hysteresis value (H) reflects the hysteresis associating with controlling the transmit power.

If current RP 106 is a portal RP 106 and the value of the Total RLF counter for the current RP 106 is less than the fourth predetermined threshold value (N4) but not less than the fourth predetermined threshold value (N4) minus the hysteresis value (H), then no adjustment is made to the transmit power of the current RP 106.

If neither of the two conditions checked in block 604 are true, the APC function 130 in the controller 104 checks if the value of the Site RLF counter for the current RP 106 is greater than a fifth predetermined threshold value (block 614).

If the value of the Site RLF counter for the current RP 106 is greater than the fifth predetermined threshold value, the transmit power for the current RP 106 is increased (block 608). In this situation, the current RP 106 is not a portal RP 106 and instead is either a coverage or boundary RP 106. In either case, if the current RP 106 is experiencing a relatively high rate of radio link failures with UEs 110 within the site cell, then the RP's transmit power is increased. In this case, the Site RLF counter is used (instead of the Total RLF counter) since the current RP 106 is either a coverage or boundary RP 106 and, as a result, is intended to serve as the primary RP 106 for UEs 110 that are well within the site cell.

If the value of the Site RLF counter for the current RP 106 is not greater than the fifth predetermined threshold value, the APC function 130 in the controller 104 checks if the value of the Leakage Rate counter for the current RP 106 is greater than a sixth predetermined threshold value (N6) and checks if the value of the Hand-Out counter is greater that a seventh predetermined threshold value ($T_{statistical}$) (block 616). If both of these conditions are true, the transmit power for the current RP 106 is decreased (block 612). If both of these conditions are not true, the transmit power for the current RP 106 is not changed.

The first condition associated with block 616 checks if the leakage rate for the current RP 106 is relatively high, which if true indicates that the current RP 106 is a boundary RP 106. The second condition associated with block 616 checks if a statistically significant number of handouts have occurred for the leakage rate value to be statistically significant. In this situation, the current RP 106 is a boundary RP 106 that is experiencing a sufficiently low number of radio link failures with UEs 110 within the site cell. In this situation, the transmit power for the current (boundary) RP 106 is backed off in order to reduce the likelihood that transmission from that RP 106 will leak outside of the site cell.

In the exemplary embodiment described here in connection with FIG. 6, when the transmit power of the current RP 106 is to be increased, the transmit power is increased by a predetermined increment (delta). However, there is a maximum transmit power $P_{max}$ beyond which the transmit power should not be increased. If increasing the transmit power of the current RP 106 would result in the transmit power being greater than the maximum transmit power $P_{max}$, then no adjustment in the transmit power is made.

A similar approach is used for decreasing the transmit power. In the exemplary embodiment described here in connection with FIG. 6, when the transmit power of the current RP 106 is to be decreased, the transmit power is decreased by a predetermined increment. However, in this exemplary embodiment, there is a maximum amount by which the transmit power of the various RPs 106 can vary. This is done, for example, to prevent the advertised transmit power for the cell varying too far from the actual transmit power of a particular RP 106.

In one example, the maximum transmit power variation is 8 decibels (dB). That is, in this implementation, the minimum transmit power is 8 db less than the maximum transmit power $P_{max}$. If decreasing the transmit power of the current RP 106 by predetermined increment would result in the transmit power being less than the minimum transmit power (that is, $P_{max}$–8 db), then no adjustment in the transmit power is made.

In one implementation, the predetermined increment used for increasing transit power is the same as the predetermined increment used for decreasing transmit power. In other implementations, the predetermined increment that is used for increasing transmit power is different from the predetermined increment for decreasing transmit power.

After the processing associated with blocks 604-616 has been performed for each of the RPs 106 assigned to the cell and the transmit power level for each of the RPs 106 is determined, the System Information Block 2 (SIB-2) Energy per Resource Element (EPRE) may need to be updated to inform the UEs 110 of the new transmit power. SIB-2 contains information that is common to all UEs 110 and is broadcasted for the entire cell. As specified by 3GPP, one of the elements in the SIB-2 message represents the cell-specific reference signal, which represents the transmit power of the eNodeB (implemented, in this case, by the controller 104 and the RPs 106). The APC function 130 sets this value to the maximum power among all RPs 106. In other implementations, this value may be set differently. For example, in one implementation SIB-2 EPRE may be set to the minimum transmit power among all RPs 106. In another implementation, it may be set to the average power among all RPs 106. The APC function 130 in the controller 104 then causes the changes in radio-point transmit power and the advertised SIB-2 EPRE to take effect in the RPs 106 at the activation time in alignment with the next modification period boundary according to 3GPP Technical Specification 36.331.

In one implementation of this exemplary embodiment, how frequently the processing associated with method 600 is performed (that is, the duration of the period T) changes. This period T can be adapted dynamically based on how whether the transmit powers for the various RPs 106 have converged.

Figure 7:
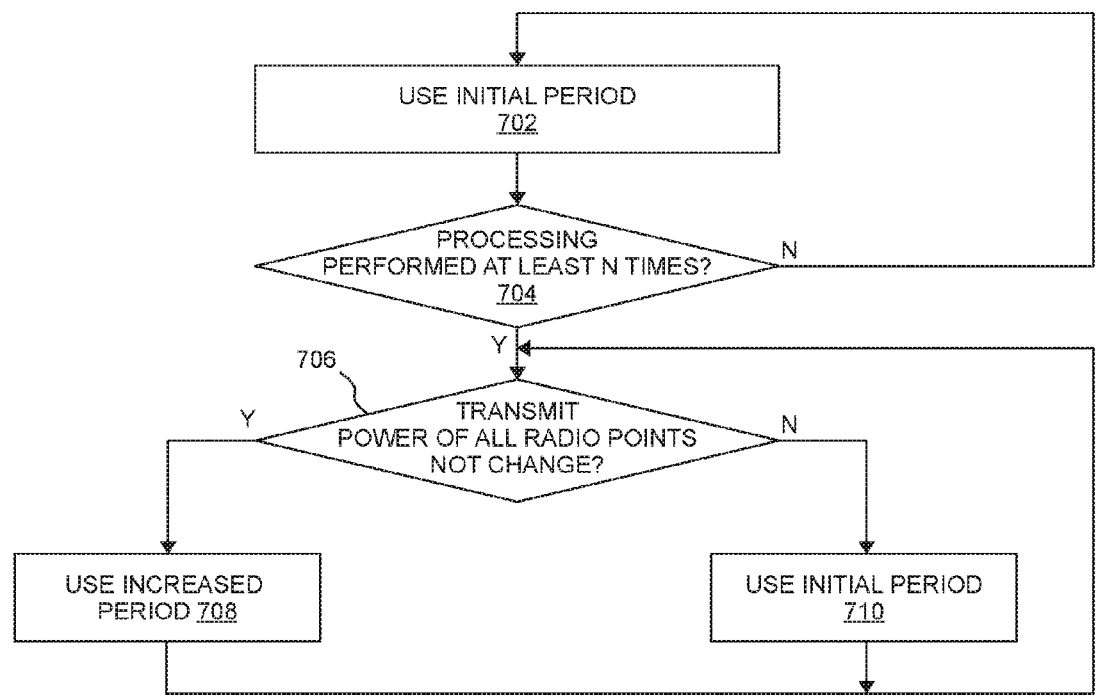
FIG. 7 is a flow diagram illustrating one exemplary embodiment of a method of dynamically adapting the period used for performing the processing associated with the method shown in FIG. 6.

FIG. 7 is a flow diagram illustrating one exemplary embodiment of a method 700 of dynamically adapting the period T used for performing the processing associated with method 600 of FIG. 6.

The embodiment of method 700 is described here as being implemented in the RAN 100 of FIG. 1, though it is to be understood that other embodiments can be implemented in other ways.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner).

Initially, the APC function 130 uses an initial period T (for example, 5 minutes) (block 702). In general, each time the processing is performed, the transmit power of each radio point 106 may be changed.

The APC function 130 of the controller 104 keeps track of the transmit power of each radio point 106 for each period. After the processing of method 600 has been performed at least a predetermined number (n) of times (block 704), the APC function 130 checks if the transmit power of any radio point has changed in the most recent period (block 706).

The transmit power for each radio point is compared to that radio point's transmit power for the previous time period.

When the transmit power for a given radio point 106 has not changed in the most recent period t, the transmit power for that radio point has either converged to a transmit power where key performance indicators (KPIs) are being met or to either the maximum or minimum transmit power.

If the transmit power for all of the radio points 106 have not changed in the most recent period, then the period T is increased to a longer period (for example, 15 minutes) (block 708).

This longer period T is used until the transmit power for any of the radio points 106 has changed in the most recent period. When this happens, the initial period T is used (block 710).

In this way, the period T used for performing the automatic power control described above in connection with method 600 of FIG. 6 can be dynamically adapted.

The exemplary embodiment of method 700 described above in connection with FIG. 7 is only one example and it is to be understood that the period T can be dynamically adapted in other ways.

In some implementations, the management system 128 is configured to enable a wireless network operator or system integrator to nominate a RP 106 as a "portal" radio point 106. However, in the event that a RP 106 is mistakenly nominated as a portal radio point 106, the operation of the method 600 described above in connection with FIG. 6 is not impacted since an RP 106 that is incorrectly nominated as a portal will not experience the greeting and handout events a true portal RP 106 would and the decision logic of method 600 will not treat the RP 106 as a portal.

In some implementations, the management system 128 is configured to enable a wireless network operator or system integrator to nominate a RP 106 as a "non-portal" radio point 106. In such implementations, the controller 104 is configured to ignore any mobility triggers (for example, the A3 or B2 events specified by 3GPP for mobility) from a UE 100 if the primary RP 106 for that UE 110 is nominated as a non-portal. This non-portal nomination can be used, for example, for RPs 106 that are located where it is not possible for a UE 110 to either enter or leave the cell (for example, on the upper floors of a multi-story building). The APC function 130 will not directly consider the "non-portal" configuration; however, as a result of ignoring mobility triggers from such an RP 106, the handover OMs collected for that RP 106 may be impacted.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments have been described. Nevertheless, it will be understood that various modifications to the described embodiments may be made without departing from the spirit and scope of the described inventions. Accordingly, other embodiments are within the scope of the following claims and the described inventions.

EXAMPLE EMBODIMENTS

Example 1 includes a system to provide wireless service to user equipment using an air interface, the system comprising: a controller communicatively coupled to a core network; and a plurality of radio points to transmit and receive radio frequency signals to and from the user equipment, each of the radio points associated with at least one antenna and located remote from the controller; wherein the plurality of radio points is communicatively coupled to the controller; wherein the controller comprises at least one baseband modem to perform Layer-3, Layer-2, and Layer-1 processing for the air interface; and wherein the controller is configured to automatically control transmit power for the radio points based on operational measurements (OMs) for each radio point, wherein the OMs are based on radio resource control (RRC) messages received at the controller.

Example 2 includes the system of Example 1, wherein each radio point is located within the cell so as to function as one of multiple types of radio points; and wherein the controller is configured to automatically control the transmit power for the radio points based on the OMs for each radio point and the type of radio point each radio point functions as.

Example 3 includes the system of Example 2, wherein the multiple types of radio points comprise: a portal type of radio point associated with a radio point being located near an entrance or an exist; a boundary type of radio point associated with a radio point being located near a window or other opening; and a coverage type of radio point.

Example 4 includes the system of Example 3, wherein, for each radio point that is located in the cell so as to function as the portal type of radio point, the controller automatically controls the transmit power in that radio point so that the transmit power is: increased when a count of total radio link failures is greater than a threshold value; and decreased when the count of total radio link failures is less than the threshold value minus a hysteresis value; and wherein the transmit power is increased for each radio point by increasing the transmit power for that radio point when the transmit power for that radio point is less than a maximum transmit power and is not changed otherwise; and wherein the transmit power is decreased for each radio point by decreasing the transmit power for that radio point when the transmit power for that radio point is greater than a minimum transmit power and is not changed otherwise.

Example 5 includes the system of any of the Examples 3-4, wherein, for each radio point that is located in the cell so as to function as the boundary type of radio point, the controller automatically controls the transmit power in that radio point so that the transmit power is decreased when a count of radio link failures for the cell is less than a threshold value; and wherein the transmit power is decreased for each radio point by decreasing the transmit power for that radio point when the transmit power for that radio point is greater than a minimum transmit power and is not changed otherwise.

Example 6 includes the system of any of the Examples 3-5, wherein, for each radio point that is located in the cell so as to function as the coverage type of radio point, the controller automatically controls the transmit power in that radio point so that the transmit power is increased when a count of radio link failures for the cell is greater than a threshold value; and wherein the transmit power is increased for each radio point by increasing the transmit power for that radio point when the transmit power for that radio point is less than a maximum transmit power and is not changed otherwise.

Example 7 includes the system of any of the Examples 1-6, wherein the controller maintains a respective signature vector (SV) for each item of user equipment, wherein each SV comprises, for each radio point, a signal reception metric indicative of a power level received by that radio point from that item of user equipment; and wherein the controller is configured to determine a primary radio point for an event that has occurred based on the signature vector maintained for each radio point and update an OM for that primary radio point that is associated with that event.

Example 8 includes the system of any of the Examples 1-7, wherein the controller is further configured to automatically control the transmit power for the radio points based on at least one of: OMs for each radio point that are indicative of a number of hand-ins to the cell for which that radio point was a primary radio point; OMs for each radio point that are indicative of a number of hand-outs to the cell for which that radio point was a primary radio point; OMs for each radio point that are indicative of leakage from the cell when that radio point was a primary radio point; and OMs for each radio point that are indicative of a number of radio link failures when that radio point was a primary radio point.

Example 9 includes the system of any of the Examples 1-8, wherein each of the radio points is configured to perform at least some Layer-1 processing for the air interface, wherein in-phase and quadrature (IQ) data representing frequency-domain symbols for the air interface are front-hauled between the controller and the radio points.

Example 10 includes the system of Example 9, wherein the IQ data representing frequency-domain symbols for the air interface are front-hauled between the controller and the radio points in a compressed form.

Example 11 includes the system of any of the Examples 9-10, wherein the IQ data representing frequency-domain symbols for the air interface are front-hauled between the controller and the radio points over an ETHERNET network.

Example 12 includes the system of any of the Examples 1-11, wherein the controller comprises a plurality of baseband units, each baseband unit providing capacity for a single cellular sector and used with a single cell sharing a common physical cell identifier and for which common control and reference signals are transmitted; and wherein the controller further comprises a central coordinator to perform central scheduling for all of the baseband units across all of the radio points.

Example 13 includes a controller for providing wireless service to user equipment using an air interface, the controller comprising: at least one baseband unit to perform Layer-3, Layer-2, and Layer-1 processing for the air interface; a front-haul interface to communicatively couple the controller to a plurality of radio points that transmit and receive radio frequency signals to and from the user equipment, each of the radio points associated with at least one antenna and located remote from the controller; and a back-haul interface to communicatively couple the controller to a core network; wherein the controller is configured to automatically control transmit power for the radio points based on operational measurements (OMs) for each radio point, wherein the OMs are based on radio resource control (RRC) messages received at the controller.

Example 14 includes the controller of Example 13, wherein each radio point is located within the cell so as to function as one of multiple types of radio points; and wherein the controller is configured to automatically control the transmit power for the radio points based on the OMs for each radio point and the type of radio point each radio point functions as.

Example 15 includes the controller of Example 14, wherein the multiple types of radio points comprise: a portal type of radio point associated with a radio point being located near an entrance or an exist; a boundary type of radio point associated with a radio point being located near a window or other opening in a site; and a coverage type of radio point.

Example 16 includes the controller of Example 15, wherein, for each radio point that is located in the cell so as to function as the portal type of radio point, the controller automatically controls the transmit power in that radio point so that the transmit power is: increased when a count of total radio link failures is greater than a threshold value; and decreased when the count of total radio link failures is less than the threshold value minus a hysteresis value; and wherein the transmit power is increased for each radio point by increasing the transmit power for that radio point when the transmit power for that radio point is less than a maximum transmit power and is not changed otherwise; and wherein the transmit power is decreased for each radio point by decreasing the transmit power for that radio point when the transmit power for that radio point is greater than a minimum transmit power and is not changed otherwise.

Example 17 includes the controller of any of the Examples 15-16, wherein, for each radio point that is located in the cell so as to function as the boundary type of radio point, the controller automatically controls the transmit power in that radio point so that the transmit power is decreased when a count of radio link failures for the cell is less than a threshold value; and wherein the transmit power is decreased for each radio point by decreasing the transmit power for that radio point when the transmit power for that radio point is greater than a minimum transmit power and is not changed otherwise.

Example 18 includes the controller of any of the Examples 15-17, wherein, for each radio point that is located in the cell so as to function as the coverage type of radio point, the controller automatically controls the transmit power in that radio point so that the transmit power is increased when a count of radio link failures for the cell is greater than a threshold value; and wherein the transmit power is increased for each radio point by increasing the transmit power for that radio point when the transmit power for that radio point is less than a maximum transmit power and is not changed otherwise.

Example 19 includes the controller of any of the Examples 13-18, wherein the controller maintains a respective signature vector (SV) for each item of user equipment, each SV comprises, for each radio point, a signal reception metric indicative of a power level received by that radio point from that item of user equipment; and wherein the controller is configured to determine a primary radio point for an event that has occurred based on the signature vector maintained for each radio point and update an OM for that primary radio point that is associated with that event.

Example 20 includes the controller of any of the Examples 13-19, wherein the controller is further configured to automatically control the transmit power for the radio points based on at least one of: OMs for each radio point that are indicative of a number of hand-ins to the cell for which that radio point was a primary radio point; OMs for each radio point that are indicative of a number of hand-outs to the cell for which that radio point was a primary radio point; OMs for each radio point that are indicative of leakage from the cell when that radio point was a primary radio point; and OMs for each radio point that are indicative of a number of radio link failures when that radio point was a primary radio point.

Example 21 includes a method of providing wireless service to user equipment using an air interface, the method comprising: performing Layer-3, Layer-2, and Layer-1 processing for the air interface in a controller that is communicatively coupled to a plurality of radio points that transmit and receive radio frequency signals to and from the user equipment, each of the radio points associated with at least one antenna and located remote from the controller; maintaining operational measurements (OMs) for each radio point in the controller, wherein the OMs are based on radio resource control (RRC) messages received at the controller; and automatically controlling transmit power for the radio points based on the OMs.

Example 22 includes the method of Example 21, wherein each radio point is located within the cell so as to function as one of multiple types of radio points; and wherein automatically controlling transmit power for the radio points based on the OMs comprises: automatically controlling the transmit power for the radio points based on the OMs for each radio point and the type of radio point each radio point functions as.

Example 23 includes the method of Example 22, wherein the multiple types of radio points comprise: a portal type of radio point associated with a radio point being located near an entrance or an exist; a boundary type of radio point associated with a radio point being located near a window or other opening in a site; and a coverage type of radio point.

Example 24 includes the method of Example 23, wherein automatically controlling the transmit power for the radio points based on the OMs comprises: for each radio point that is located in the cell so as to function as the portal type of radio point: increasing the transmit power of that radio point when a count of total radio link failures is greater than a threshold value; an decreasing the transmit power of that radio point when the count of total radio link failures is less than the threshold value minus a hysteresis value; and wherein the transmit power is increased for each radio point by increasing the transmit power for that radio point when the transmit power for that radio point is less than a maximum transmit power and is not changed otherwise; and wherein the transmit power is decreased for each radio point by decreasing the transmit power for that radio point when the transmit power for that radio point is greater than a minimum transmit power and is not changed otherwise.

Example 25 includes the method of any of the Examples 23-24, wherein automatically controlling the transmit power for the radio points based on the OMs comprises: for each radio point that is located in the cell so as to function as the boundary type of radio point: decreasing the transit power of that radio point when a count of radio link failures for the cell is less than a threshold value; and wherein the transmit power is decreased for each radio point by decreasing the transmit power for that radio point when the transmit power for that radio point is greater than a minimum transmit power and is not changed otherwise.

Example 26 includes the method of any of the Examples 23-25, wherein automatically controlling the transmit power for the radio points based on the OMs comprises: for each radio point that is located in the cell so as to function as the coverage type of radio point: increasing the transmit power of that radio point when a count of radio link failures for the cell is greater than a threshold value; and wherein the transmit power is increased for each radio point by increasing the transmit power for that radio point when the transmit power for that radio point is less than a maximum transmit power and is not changed otherwise.

Example 27 includes the method of any of the Examples 21-26, further comprising maintaining a respective signature vector (SV) for each item of user equipment, wherein each SV comprises, for each radio point, a signal reception metric indicative of a power level received by that radio point from that item of user equipment; and determining a primary radio point for an event that has occurred based on the signature vector maintained for each radio point and updating an OM for that primary radio point that is associated with that event.

Example 28 includes the method of any of the Examples 21-27, wherein automatically controlling the transmit power for the radio points based on the OMs comprises: automatically controlling the transmit power for the radio points based on at least one of: OMs for each radio point that are indicative of a number of hand-ins to the cell for which that radio point was a primary radio point; OMs for each radio point that are indicative of a number of hand-outs to the cell for which that radio point was a primary radio point; OMs for each radio point that are indicative of leakage from the cell when that radio point was a primary radio point; and OMs for each radio point that are indicative of a number of radio link failures when that radio point was a primary radio point.

What is claimed is:

1. A system to provide wireless service to user equipment using an air interface, the system comprising:
   a controller communicatively coupled to a core network; and
   a plurality of radio points to transmit and receive radio frequency signals to and from the user equipment, each of the radio points associated with at least one antenna and located remote from the controller;
   wherein the plurality of radio points is communicatively coupled to the controller;
   wherein the controller comprises at least one baseband modem to perform Layer-3, Layer-2, and Layer-1 processing for the air interface; and
   wherein the controller is configured to automatically control transmit power for the radio points based on operational measurements (OMs) for each radio point, wherein the OMs are based on radio resource control (RRC) messages received at the controller.

2. The system of claim 1, wherein each radio point is located within the cell so as to function as one of multiple types of radio points; and
   wherein the controller is configured to automatically control the transmit power for the radio points based on the OMs for each radio point and the type of radio point each radio point functions as.

3. The system of claim 2, wherein the multiple types of radio points comprise:
   a portal type of radio point associated with a radio point being located near an entrance or an exist;
   a boundary type of radio point associated with a radio point being located near a window or other opening; and
   a coverage type of radio point.

4. The system of claim 3, wherein, for each radio point that is located in the cell so as to function as the portal type of radio point, the controller automatically controls the transmit power in that radio point so that the transmit power is:
   increased when a count of total radio link failures is greater than a threshold value; and
   decreased when the count of total radio link failures is less than the threshold value minus a hysteresis value; and
   wherein the transmit power is increased for each radio point by increasing the transmit power for that radio point when the transmit power for that radio point is less than a maximum transmit power and is not changed otherwise; and
   wherein the transmit power is decreased for each radio point by decreasing the transmit power for that radio point when the transmit power for that radio point is greater than a minimum transmit power and is not changed otherwise.

5. The system of claim 3, wherein, for each radio point that is located in the cell so as to function as the boundary type of radio point, the controller automatically controls the transmit power in that radio point so that the transmit power is decreased when a count of radio link failures for the cell is less than a threshold value; and
   wherein the transmit power is decreased for each radio point by decreasing the transmit power for that radio point when the transmit power for that radio point is greater than a minimum transmit power and is not changed otherwise.

6. The system of claim 3, wherein, for each radio point that is located in the cell so as to function as the coverage type of radio point, the controller automatically controls the transmit power in that radio point so that the transmit power is increased when a count of radio link failures for the cell is greater than a threshold value; and
   wherein the transmit power is increased for each radio point by increasing the transmit power for that radio point when the transmit power for that radio point is less than a maximum transmit power and is not changed otherwise.

7. The system of claim 1, wherein the controller maintains a respective signature vector (SV) for each item of user equipment, wherein each SV comprises, for each radio point, a signal reception metric indicative of a power level received by that radio point from that item of user equipment; and
   wherein the controller is configured to determine a primary radio point for an event that has occurred based on the signature vector maintained for each radio point and update an OM for that primary radio point that is associated with that event.

8. The system of claim 1, wherein the controller is further configured to automatically control the transmit power for the radio points based on at least one of:
   OMs for each radio point that are indicative of a number of hand-ins to the cell for which that radio point was a primary radio point;
   OMs for each radio point that are indicative of a number of hand-outs to the cell for which that radio point was a primary radio point;
   OMs for each radio point that are indicative of leakage from the cell when that radio point was a primary radio point; and
   OMs for each radio point that are indicative of a number of radio link failures when that radio point was a primary radio point.

9. The system of claim 1, wherein each of the radio points is configured to perform at least some Layer-1 processing for the air interface, wherein in-phase and quadrature (IQ) data representing frequency-domain symbols for the air interface are front-hauled between the controller and the radio points.

10. The system of claim 9, wherein the IQ data representing frequency-domain symbols for the air interface are front-hauled between the controller and the radio points in a compressed form.

11. The system of claim 9, wherein the IQ data representing frequency-domain symbols for the air interface are front-hauled between the controller and the radio points over an ETHERNET network.

12. The system of claim 1, wherein the controller comprises a plurality of baseband units, each baseband unit providing capacity for a single cellular sector and used with a single cell sharing a common physical cell identifier and for which common control and reference signals are transmitted; and
 wherein the controller further comprises a central coordinator to perform central scheduling for all of the baseband units across all of the radio points.

13. A controller for providing wireless service to user equipment using an air interface, the controller comprising:
 at least one baseband unit to perform Layer-3, Layer-2, and Layer-1 processing for the air interface;
 a front-haul interface to communicatively couple the controller to a plurality of radio points that transmit and receive radio frequency signals to and from the user equipment, each of the radio points associated with at least one antenna and located remote from the controller; and
 a back-haul interface to communicatively couple the controller to a core network;
 wherein the controller is configured to automatically control transmit power for the radio points based on operational measurements (OMs) for each radio point, wherein the OMs are based on radio resource control (RRC) messages received at the controller.

14. The controller of claim 13, wherein each radio point is located within the cell so as to function as one of multiple types of radio points; and
 wherein the controller is configured to automatically control the transmit power for the radio points based on the OMs for each radio point and the type of radio point each radio point functions as.

15. The controller of claim 14, wherein the multiple types of radio points comprise:
 a portal type of radio point associated with a radio point being located near an entrance or an exist;
 a boundary type of radio point associated with a radio point being located near a window or other opening in a site; and
 a coverage type of radio point.

16. The controller of claim 15, wherein, for each radio point that is located in the cell so as to function as the portal type of radio point, the controller automatically controls the transmit power in that radio point so that the transmit power is:
 increased when a count of total radio link failures is greater than a threshold value; and
 decreased when the count of total radio link failures is less than the threshold value minus a hysteresis value; and
 wherein the transmit power is increased for each radio point by increasing the transmit power for that radio point when the transmit power for that radio point is less than a maximum transmit power and is not changed otherwise; and
 wherein the transmit power is decreased for each radio point by decreasing the transmit power for that radio point when the transmit power for that radio point is greater than a minimum transmit power and is not changed otherwise.

17. The controller of claim 15, wherein, for each radio point that is located in the cell so as to function as the boundary type of radio point, the controller automatically controls the transmit power in that radio point so that the transmit power is decreased when a count of radio link failures for the cell is less than a threshold value; and
 wherein the transmit power is decreased for each radio point by decreasing the transmit power for that radio point when the transmit power for that radio point is greater than a minimum transmit power and is not changed otherwise.

18. The controller of claim 15, wherein, for each radio point that is located in the cell so as to function as the coverage type of radio point, the controller automatically controls the transmit power in that radio point so that the transmit power is increased when a count of radio link failures for the cell is greater than a threshold value; and
 wherein the transmit power is increased for each radio point by increasing the transmit power for that radio point when the transmit power for that radio point is less than a maximum transmit power and is not changed otherwise.

19. The controller of claim 13, wherein the controller maintains a respective signature vector (SV) for each item of user equipment, each SV comprises, for each radio point, a signal reception metric indicative of a power level received by that radio point from that item of user equipment; and
 wherein the controller is configured to determine a primary radio point for an event that has occurred based on the signature vector maintained for each radio point and update an OM for that primary radio point that is associated with that event.

20. The controller of claim 13, wherein the controller is further configured to automatically control the transmit power for the radio points based on at least one of:
 OMs for each radio point that are indicative of a number of hand-ins to the cell for which that radio point was a primary radio point;
 OMs for each radio point that are indicative of a number of hand-outs to the cell for which that radio point was a primary radio point;
 OMs for each radio point that are indicative of leakage from the cell when that radio point was a primary radio point; and
 OMs for each radio point that are indicative of a number of radio link failures when that radio point was a primary radio point.

21. A method of providing wireless service to user equipment using an air interface, the method comprising:
 performing Layer-3, Layer-2, and Layer-1 processing for the air interface in a controller that is communicatively coupled to a plurality of radio points that transmit and receive radio frequency signals to and from the user equipment, each of the radio points associated with at least one antenna and located remote from the controller;
 maintaining operational measurements (OMs) for each radio point in the controller, wherein the OMs are based on radio resource control (RRC) messages received at the controller; and
 automatically controlling transmit power for the radio points based on the OMs.

22. The method of claim 21, wherein each radio point is located within the cell so as to function as one of multiple types of radio points; and
   wherein automatically controlling transmit power for the radio points based on the OMs comprises:
      automatically controlling the transmit power for the radio points based on the OMs for each radio point and the type of radio point each radio point functions as.

23. The method of claim 22, wherein the multiple types of radio points comprise:
   a portal type of radio point associated with a radio point being located near an entrance or an exist;
   a boundary type of radio point associated with a radio point being located near a window or other opening in a site; and
   a coverage type of radio point.

24. The method of claim 23, wherein automatically controlling the transmit power for the radio points based on the OMs comprises:
   for each radio point that is located in the cell so as to function as the portal type of radio point:
      increasing the transmit power of that radio point when a count of total radio link failures is greater than a threshold value; and
      decreasing the transmit power of that radio point when the count of total radio link failures is less than the threshold value minus a hysteresis value; and
   wherein the transmit power is increased for each radio point by increasing the transmit power for that radio point when the transmit power for that radio point is less than a maximum transmit power and is not changed otherwise; and
   wherein the transmit power is decreased for each radio point by decreasing the transmit power for that radio point when the transmit power for that radio point is greater than a minimum transmit power and is not changed otherwise.

25. The method of claim 23, wherein automatically controlling the transmit power for the radio points based on the OMs comprises:
   for each radio point that is located in the cell so as to function as the boundary type of radio point: decreasing the transit power of that radio point when a count of radio link failures for the cell is less than a threshold value; and
   wherein the transmit power is decreased for each radio point by decreasing the transmit power for that radio point when the transmit power for that radio point is greater than a minimum transmit power and is not changed otherwise.

26. The method of claim 23, wherein automatically controlling the transmit power for the radio points based on the OMs comprises:
   for each radio point that is located in the cell so as to function as the coverage type of radio point: increasing the transmit power of that radio point when a count of radio link failures for the cell is greater than a threshold value; and
   wherein the transmit power is increased for each radio point by increasing the transmit power for that radio point when the transmit power for that radio point is less than a maximum transmit power and is not changed otherwise.

27. The method of claim 21, further comprising maintaining a respective signature vector (SV) for each item of user equipment, wherein each SV comprises, for each radio point, a signal reception metric indicative of a power level received by that radio point from that item of user equipment; and
   determining a primary radio point for an event that has occurred based on the signature vector maintained for each radio point and updating an OM for that primary radio point that is associated with that event.

28. The method of claim 21, wherein automatically controlling the transmit power for the radio points based on the OMs comprises:
   automatically controlling the transmit power for the radio points based on at least one of:
      OMs for each radio point that are indicative of a number of hand-ins to the cell for which that radio point was a primary radio point;
      OMs for each radio point that are indicative of a number of hand-outs to the cell for which that radio point was a primary radio point;
      OMs for each radio point that are indicative of leakage from the cell when that radio point was a primary radio point; and
      OMs for each radio point that are indicative of a number of radio link failures when that radio point was a primary radio point.

* * * * *

UNITED STATES PATENT AND TRADEMARK OFFICE
CERTIFICATE OF CORRECTION

PATENT NO. : 10,244,472 B2
APPLICATION NO. : 15/442361
DATED : March 26, 2019
INVENTOR(S) : Sarjoui et al.

Page 1 of 1

It is certified that error appears in the above-identified patent and that said Letters Patent is hereby corrected as shown below:

In the Specification

Column 15, Line 33, please replace "exist" with --exit--.

Column 17, Line 11, please replace "exist" with --exit--.

Column 18, Line 33, please replace "exist" with --exit--.

In the Claims

At Claim 2, Column 19, Line 52, please replace "the cell" with --a cell--.

At Claim 3, Column 19, Line 61, please replace "exist" with --exit--.

At Claim 8, Column 20, Line 55, please replace "the cell" with --a cell--.

At Claim 14, Column 21, Line 40, please replace "the cell" with --a cell--.

At Claim 15, Column 21, Line 49, please replace "exist" with --exit--.

At Claim 20, Column 20, Line 42, please replace "the cell" with --a cell--.

At Claim 22, Column 23, Line 2, please replace "the cell" with --a cell--.

At Claim 23, Column 23, Line 13, please replace "exist" with --exit--.

At Claim 28, Column 24, Line 35, please replace "the cell" with --a cell--.

Signed and Sealed this
Twenty-eighth Day of May, 2019

Andrei Iancu
*Director of the United States Patent and Trademark Office*